(12) United States Patent
Jiang et al.

(10) Patent No.: US 8,121,154 B2
(45) Date of Patent: Feb. 21, 2012

(54) THULIUM AND/OR HOLMIUM DOPED SILICATED GLASSES FOR TWO MICRON LASERS

(75) Inventors: Shibin Jiang, Tucson, AZ (US); Tao Luo, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 864 days.

(21) Appl. No.: 12/113,865

(22) Filed: May 1, 2008

(65) Prior Publication Data

US 2011/0058577 A1    Mar. 10, 2011

(51) Int. Cl.
*H01S 3/30* (2006.01)

(52) U.S. Cl. .......................................................... 372/6
(58) Field of Classification Search ....................... 372/6
See application file for complete search history.

(56) References Cited

U.S. PATENT DOCUMENTS

| 7,298,547 | B1 * | 11/2007 | Jiang et al. ............. 359/341.1 |
| 7,298,768 | B1 * | 11/2007 | Jiang .......................... 372/40 |

* cited by examiner

*Primary Examiner* — Patrick Stafford
(74) *Attorney, Agent, or Firm* — Dale F. Regelman; Quarles & Brady LLP

(57) ABSTRACT

A laser glass fiber with a core of the fiber composition, comprising a silicate glass host, one or more glass network modifiers, one or more glass network intermediators, and Thulium ions, Holmium ions, or a combination of Thulium ions and Holmium ions. The fiber emits laser light from 1.7 micron to 2.2 micron.

7 Claims, 8 Drawing Sheets

THULIUM AND/OR HOLMIUM DOPED SILICATED GLASSES FOR TWO MICRON LASERS

GOVERNMENT RIGHTS

The U.S. Government has a paid-up license in this invention and the right in limited circumstances to require the patent owner to license others on reasonable terms as provided for by the terms of Grant No. FA8650-07-M-5412.

FIELD OF THE INVENTION

This invention relates to glasses and fibers for laser applications. More specifically, this invention is directed to Thulium-doped, Holmium-doped, and Thulium/Holmium co-doped, silicate glasses for near 2 micron fiber lasers with high quantum efficiency.

BACKGROUND OF THE INVENTION

Near 2 micron fiber lasers are of great interest because of the potential possibility of combining high output power and retina safety together, which are needed for a wide variety of commercial and military applications including materials process, remote sensing, and bio-medical application. Due to the stronger absorption of many materials containing water molecules and organic materials at 2 micron than at 1 micron, less power of 2 micron fiber laser is needed compared to 1 micron fiber laser in order to achieve the same effect. More importantly, 2 micron is classified as retina safe wavelength (frequently called as eye-safe laser), which is much safer than 1 micron laser. Up to now, majority of the high power fiber laser development focus on 1 micron $Yb^{3+}$-doped fiber laser.

SUMMARY OF THE INVENTION

Considering the inherent critical drawbacks associated with silica and germanate glass fibers, Applicants have prepared highly $Tm^{3+}$-doped, $Ho^{3+}$-doped, and $Tm^{3+}/Ho^{3+}$-doped, silicate glass fiber for 2 micron fiber laser application. By "silicate glass," Applicants mean multi-component glass with $SiO_2$ as the glass network former. In contrast to silica glass, silicate glass contains glass network modifiers such as alkali ions and alkaline metal ions, and glass network intermediates such as aluminum oxide and boron oxide in addition to glass network former of $SiO_2$. In most cases, the content of $SiO_2$ is not higher than 80 mole percent in silicate glasses.

Applicants have found that high concentration of rare-earth oxides can be doped into silicate glasses without the so-called ion-clusters mainly because of the glass network modifiers. The glass network modifiers, such as sodium ions, potassium ions, barium ions, and calcium ions, break the well-defined glass network of silica, thereby producing sites for rare-earth ions. Applicants have found that silicate glass fiber exhibits numerous advantages over silica fiber, germanate glass fiber and other multi-component glass fibers as the host for highly efficient and high power fiber laser near 2 microns.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
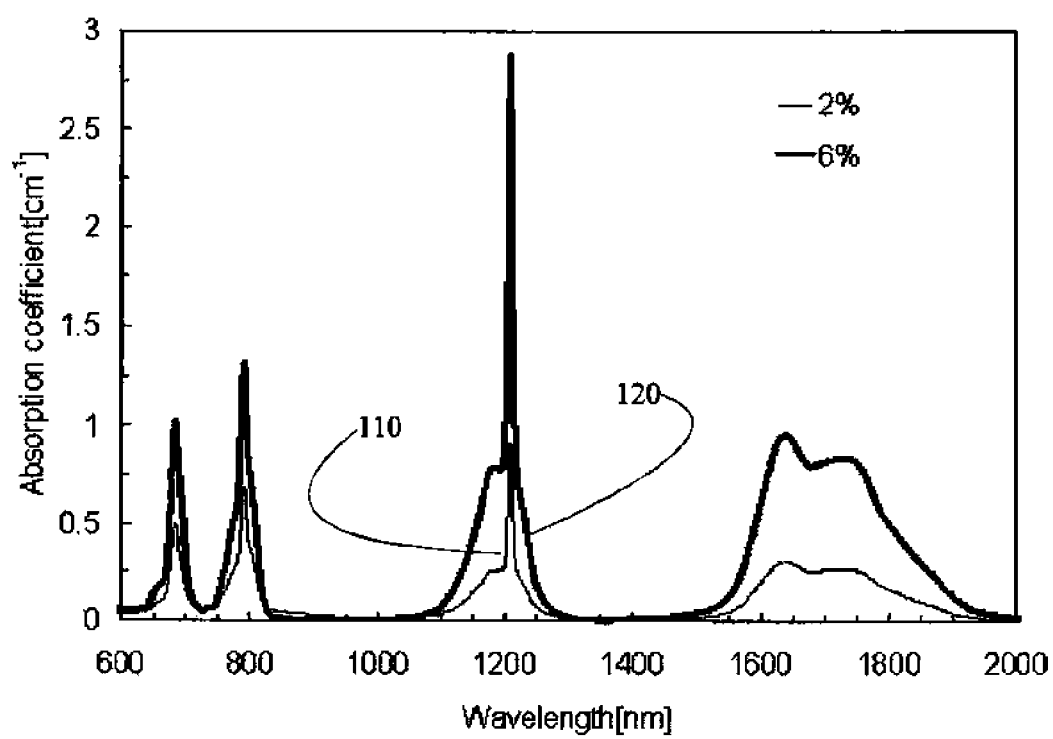
FIG. 1 illustrates absorption spectra of $Tm^{3+}$-doped silicate glasses with different doping concentrations.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Near 2 micron fiber lasers can be generated from $Tm^{3+}$-doped, $Ho^{3+}$-doped and $Tm^{3+}/Ho^{3+}$-co-doped fibers. The laser wavelengths can vary from 1.8 micron to 2.2 micron, which is generally called 2 micron fiber laser. $Tm^{3+}$-doped and $Tm^{3+}/Ho^{3+}$-co-doped fibers can be used to generate near 2 micron fiber lasers because diode lasers near 800 nm can be used as a pump source. In some cases pump lasers from 1.5 micron to 1.9 micron are used to excite the active rare-earth ions from the ground state to the lasing state, which is called in-band pumping. When a near 800 nm laser is used as pump source, the quantum efficiency can be close to 200% because of the so-called cross-relaxation process of $Tm^{3+}$ ions.

$Tm^{3+}$ cross-relaxation is a non-radiative process in which an excited $Tm^{3+}$ in the $^3H_4$ level decays to the $^3F_4$ level and a neighboring ground-state $Tm^{3+}$ ion is excited to the $^3F_4$ level, accompanied by the emission of phonons when the $Tm^{3+}$ doping concentration is sufficiently high. $Tm^{3+}$ doped crystals the probability of $Tm^{3+}$ cross relaxation is negligible for concentration less than about 2 weight percent but approaches unity for concentrations greater than about 5 weight percent.

The cross-relaxation process was observed in $Tm^{3+}$-doped silica fiber when the doping concentration reached 2.2 weight percent, resulting in a quantum efficiency of 120%. Cross-relaxation was also realized in germanate glasses with 4 weight percent $Tm^{3+}$ doping concentration, where a quantum efficiency of 170% was demonstrated. Highly efficient fiber lasers were demonstrated in both silica fiber laser and germanate glass fiber by taking advantage the cross-relaxation of $Tm^{3+}$ ions. By using $Tm^{3+}$-doped germanate glass fiber 2 μm fiber laser with more than 100 W output power and 68% slope efficiency was demonstrated.

However, both $Tm^{3+}$-doped silica fiber and $Tm^{3+}$-doped germanate glass fiber suffer many problems for practical fiber laser applications. For $Tm^{3+}$-doped silica fiber, the doping concentration of $Tm^{3+}$ ions is restricted to around 2.2 weight percent of $Tm_2O_3$, which limits the benefit of cross-relaxation of $Tm^{3+}$ ions. As a result, the efficiency is relatively low. The limited cross-relaxation also results in more visible and UV emission via upconversion, which accelerate the photodarkening of $Tm^{3+}$-doped silica fiber.

When photodarkening occurs, the laser efficiency decreases, and sometimes the laser operation even stops. $Tm^{3+}$-doped germanate glass fiber also suffers photodarkening problems. The major component of germanate glasses is germanium oxide. Germanium oxide can be doped into silica glass fiber to produce photosensitivity of silica fiber. Germanate glass is also photosensitive. Therefore, both $Tm^{3+}$-doped silica fiber and germanate glass fiber suffer photodarkening problem, which significantly affects the fiber laser performance, especially for long term performance. Another problem associated with germanate glass fiber is that $GeO_2$ is very expensive.

It is well known that the doping concentration of rare-earth ions in silica fiber is limited due to the intrinsic glass network structure. Various approaches are developed to increase the doping concentration including co-doping with $Al_2O_3$, $B_2O_3$, and $P_2O_5$ and using nano-particles. The highest doping level is limited to 1 or 2 weight percent of rare-earth oxide, which is still far away from 4 to 6 weight percent required for efficient cross-relaxation energy transfer of $Tm^{3+}$ ions. High $Tm^{3+}$ doping concentrations can be achieved in silicate glasses due to its less defined glass network, which enables the maximum benefit of cross-relaxation energy transfer. Quantum efficiency near 200% can be achieved when $Tm^{3+}$-doped fiber laser is pumped with near 800 nm laser diodes. Such high quantum efficiency will results in a high slope efficiency and relatively small amount of heat.

Because of the limited doping concentration of $Tm^{3+}$ ions in silica fiber, the cross-relaxation process is limited, which results in more visible and UV emission via upconversion. UV emission accelerates the photodarkening of $Tm^{3+}$-doped silica fiber. Photo-darkening is an existing issue for high power $Yb^{3+}$-doped silica fiber laser where almost no visible light is produced in the active fiber because of the simple two level energy system of $Yb^{3+}$ ions.

A significant advantage of silicate glass fiber over germanate glass fiber is the stronger resistance to photo-darkening. The major component of germanate glasses is germanium oxide. Germanium oxide is commonly doped into silica glass fiber to produce photosensitivity of silica fiber. Obviously germanate glass is photosensitive.

Silicate glasses and germanate glasses comprise different glass network formers. The bond strength of Si—O is stronger than that of Ge—O. Logically the mechanical strength of silicate glasses typically is stronger than germanate glasses, and the coefficient of thermal expansion of silicate glasses is smaller. The smaller the coefficient of thermal expansion the higher the thermal shock resistance. A higher thermal shock resistance and a stronger mechanical strength yield a higher pump heat induced damage threshold and laser induced damage threshold, which are critical in order to achieve high fiber laser power.

Although silica fiber will not be used for laser generation, Passive ssilica fiber is the most suitable fiber for laser delivery and probably also for gratings to form the laser cavity. Silica fiber has relatively low loss (~0.1 dB/m) at 2 μm as laser delivery fiber because typically a few meters of fiber are sufficient. Rare-earth doped Ssilicate glass fiber can be easily fusion spliced with silica fiber.

The fabrication cost of silicate glasses and germanate glasses is very similar. But the price of $GeO_2$ is one order of magnitude higher than $SiO_2$, which makes germanate glasses extremely expensive.

Other multi-component glasses such as phosphate glasses, borate glasses, tellurite glasses, and fluoride glasses are not suitable as host of $Tm^{3+}$ ions for high power 2 micron laser generation. Phosphate glasses and borate glasses are not suitable because of their higher phonon energy. Phosphate glasses and borate glasses exhibit phonon energy of ~1300 $cm^{-1}$, and ~1350 $cm^{-1}$, respectively. Due to the narrow energy gap between the $^3F_4$-$^3H_6$ transition of $Tm^{3+}$ ions, quantum efficiency can be noticeably reduced through multi-phonon relaxation process when the host material has high phonon energy. The maximum phonon energy of silica and silicate glass is almost identical, ~1100 $cm^{-1}$, while the overall phonon energy of silicate glass is slightly smaller. Germanate glass exhibits small phonon energy of ~900 $cm^{-1}$. In fact, both tellurite glass and fluoride glasses have much smaller phonon energy of ~750 $cm^{-1}$, and ~500 $cm^{-1}$, respectively, which could be advantageous as host for $Tm^{3+}$ ions for 2 μm laser generation. Unfortunately, their weak mechanical strength, lower thermal shock resistance, and poor chemical durability prevent their use for high power fiber laser applications.

Applicants designed glass compositions, and fabricated a series of silicate glasses, which exhibit good rare-earth solubility and thermal properties. The strong Si—O bonds which form the glass host matrix can be perturbed using one or more Network Modifiers ("MO"). Generally speaking, Network Modifiers affect, inter alia, the thermal expansion, hardness, chemical durability, density, surface tension, and refractive index, of a pure $SiO_2$ glass. In certain embodiments, Applicants' silicate glass $SiO_2$ glass host is modified using one or more MO materials selected BaO, CaO, MgO, ZnO, PbO, $K_2O$, $Na_2O$, $Li_2O$, $Y_2O_3$, or combinations thereof, from 5 weight percent to 40 weight percent.

In certain embodiments, Applicants' laser glass composition comprises one or more glass network intermediators (XO). A glass network intermediator modifies the host glass network, thereby creating additional dopant sites. In certain embodiments, the one or more glass network intermediators bridge some of the bonds in the network thereby increasing the network's strength and chemical durability without raising the melting temperature appreciably. In certain embodiments, Applicants' silicate glass $SiO_2$ glass host is modified using one or more XO materials selected from $Al_2O_3$, $B_2O_3$, $La_2O_3$, or combinations thereof, from 0.5 weight percent to 40 weight percent. Table I recites Applicants' glass compositions.

TABLE 1

Glass compositions in mole percent

| Glass No. | $SiO_2$ | $Al_2O_3$ | $Li_2O$ | $Na_2O$ | CaO | BaO |
|---|---|---|---|---|---|---|
| S—Tm-1 | 55 | 5 | 7.5 | 7.5 | 12.5 | 12.5 |
| S—Tm-2 | 55 | 5 | 10 | 10 | 10 | 10 |
| S—Tm-3 | 55 | 2.5 | 7.5 | 7.5 | 13.75 | 13.75 |
| S—Tm-4 | 55 | 2.5 | 8.75 | 8.75 | 12.5 | 12.5 |

Good rare-earth solubility is needed because, in certain embodiments, the doping concentration of $Tm_2O_3$ is between about 4 weight percent to about 7 weight percent. Glass has to exhibit excellent thermal properties because during fiber drawing process fiber preform will be heated up to glass softening temperature, which is around 200° C. above the glass transition temperature. No crystallization should occur during fiber drawing process. Otherwise, scattering loss will be introduced in the fiber.

Applicants utilized starting materials comprising a purity greater than about 99.99%. Glasses were melted in a platinum crucible in a resistance heated furnace. Typically, chemicals were loaded at 1350° C., and heated to 1500° C. after melting. Glass liquid was kept at around 1500° C. in liquid nitrogen protected environment in order to remove OH⁻ groups from the glass. Then the glass was cast into a preheated aluminum mold.

After the glass solidifies, it is moved into an annealing oven for annealing process to remove the cast induced stress. Glass samples for thermal properties characterization, refractive index measurement, and absorption measurement were fabricated.

Applicants fabricated silicate glasses with doping concentrations of 2 weight percent, 3 weight percent, 4 weight percent, 5 weight percent, and 6 weight percent of $Tm_2O_3$. FIG. 1 illustrates absorption spectra 100 comprising spectrum 110 for a 2 weight percent $Tm_2O_3$ doping, and spectrum 120 for a 6 weight percent $Tm_2O_3$ doping.

Undoped cladding glasses were also fabricated. As those skilled in the art will appreciate, cladding glasses must comprise a similar thermal expansion coefficient with respect to the doped core glass to ensure low mechanical and thermal stress in the fiber, and a lower refractive index compared to the core glass to form waveguide.

Figure 2:
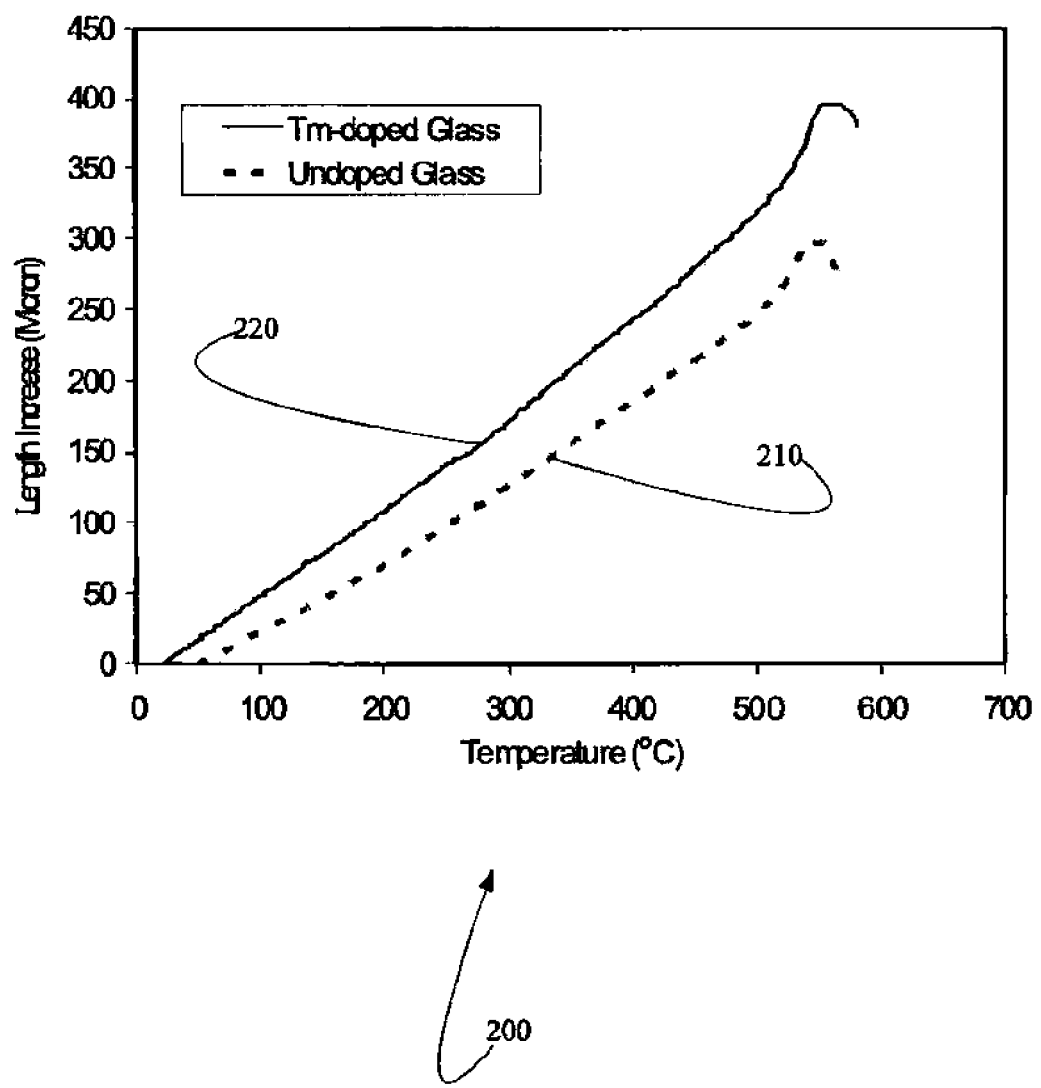
FIG. 2 illustrates thermal expansion curves of $Tm^{3+}$-doped silicate glass and undoped cladding glass.

FIG. 2 illustrates thermal expansion curves of both $Tm^{3+}$-doped silicate glass and undoped silicate glass. The difference of the thermal expansion coefficients between the core glass and the cladding glass is less than 10%.

Fiber preforms were formed with doped core glass rod and undoped cladding glass tubes. Doped core glass rods were drilled from a bulk core glass using diamond core drill. The barrel of the rod is polished to a high surface quality. Undoped cladding glass tubes were drilled from cladding glasses. Both inside and outside surfaces of the glass tubes are polished to a high surface quality. $Tm^{3+}$-doped silicate glass fibers were pulled in our own fiber drawing tower.

Figure 4:
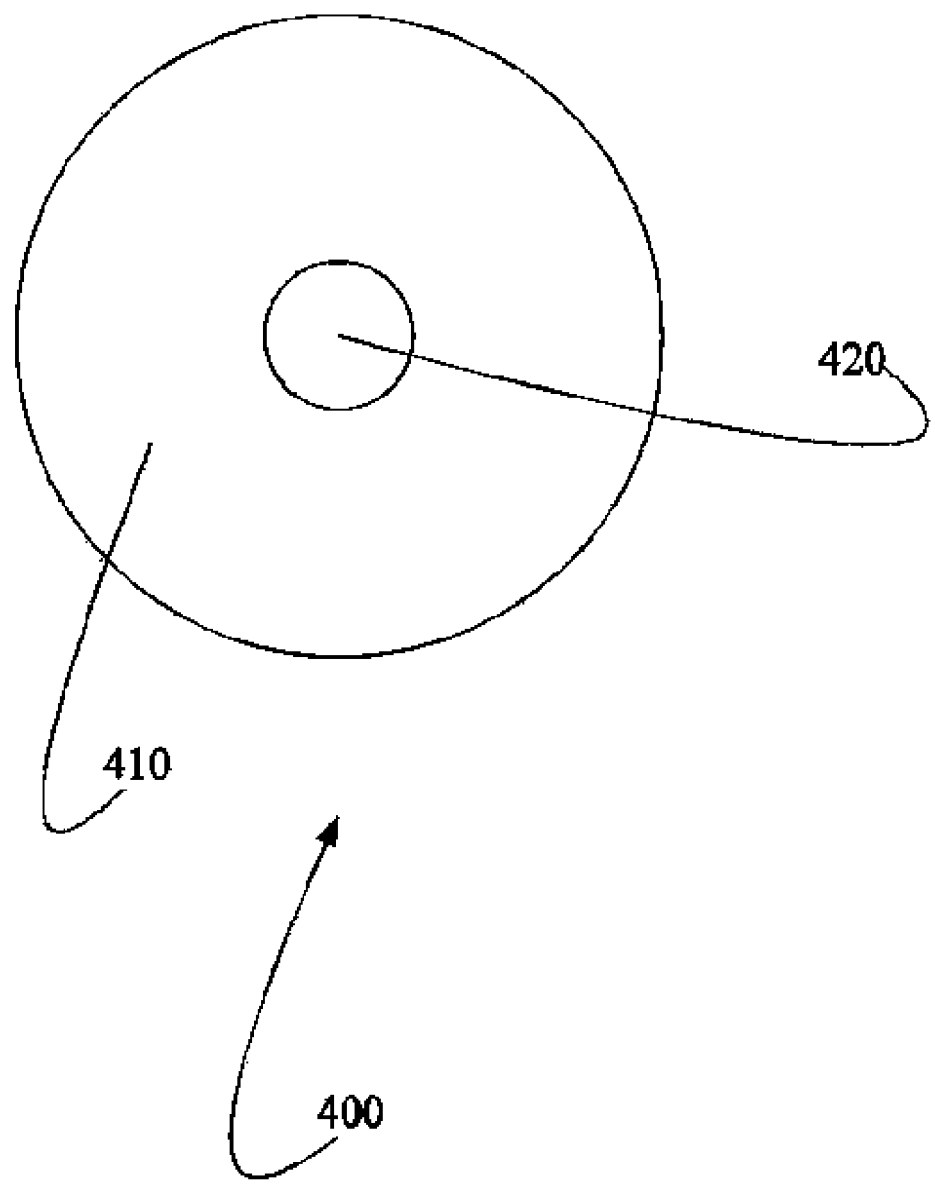
FIG. 4 shows a cross section view of single cladding $Tm^{3+}$-doped silicate glass fiber.

FIG. 4 shows a fiber preform 400 comprising cladding 410 and core 420. In certain embodiments, the cladding diameter was about 229 microns, and the core diameter was about 41.5 microns.

Figure 5:
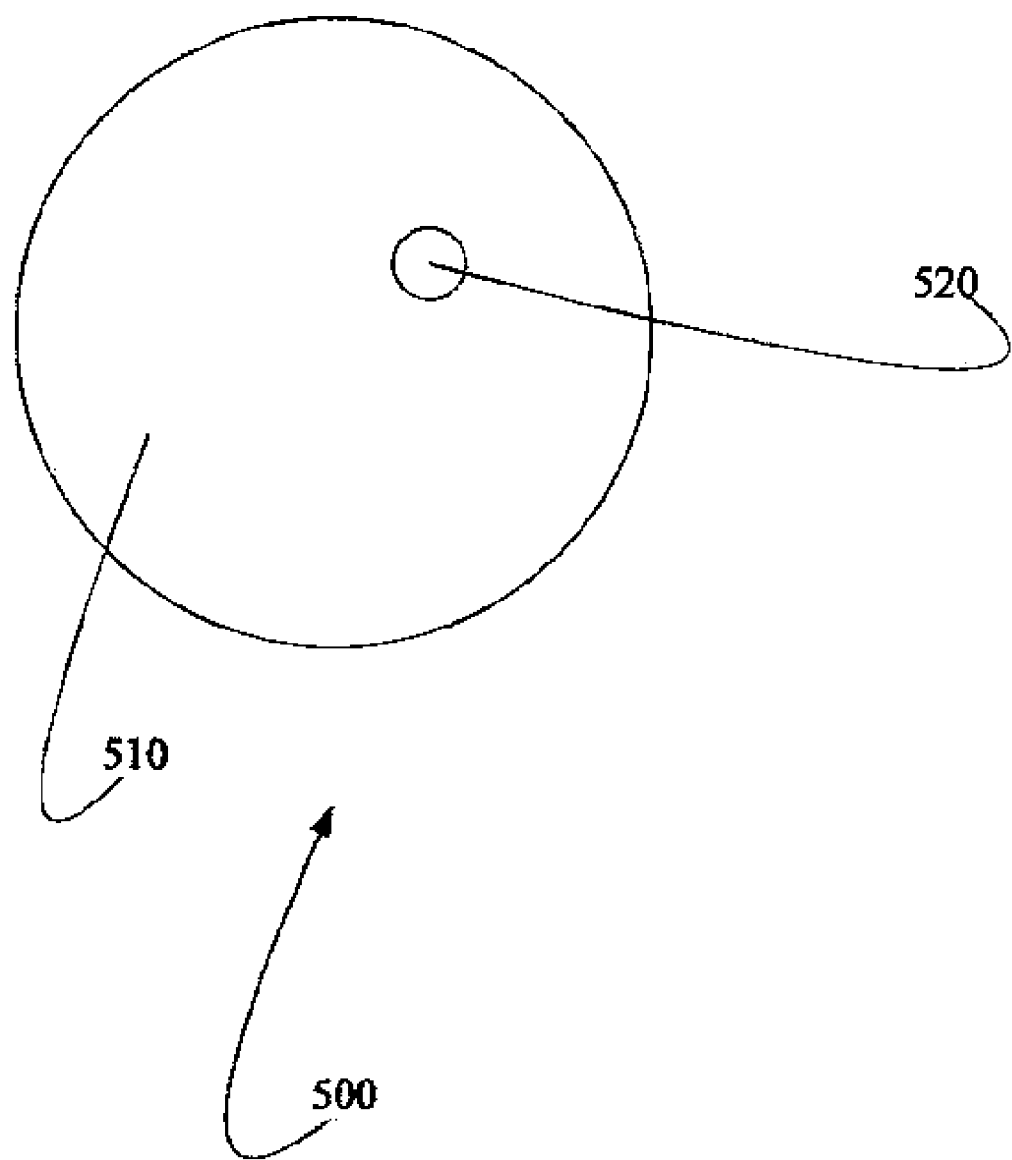
FIG. 5 shows a cross section view of on off-center single cladding $Tm^{3+}$-doped silicate glass fiber.

FIG. 5 shows a fiber preform 500 comprising cladding 510 and off-center core 520. In certain embodiments, the cladding diameter was about 216 microns, and the core diameter was about 18.5 microns.

Figure 6:
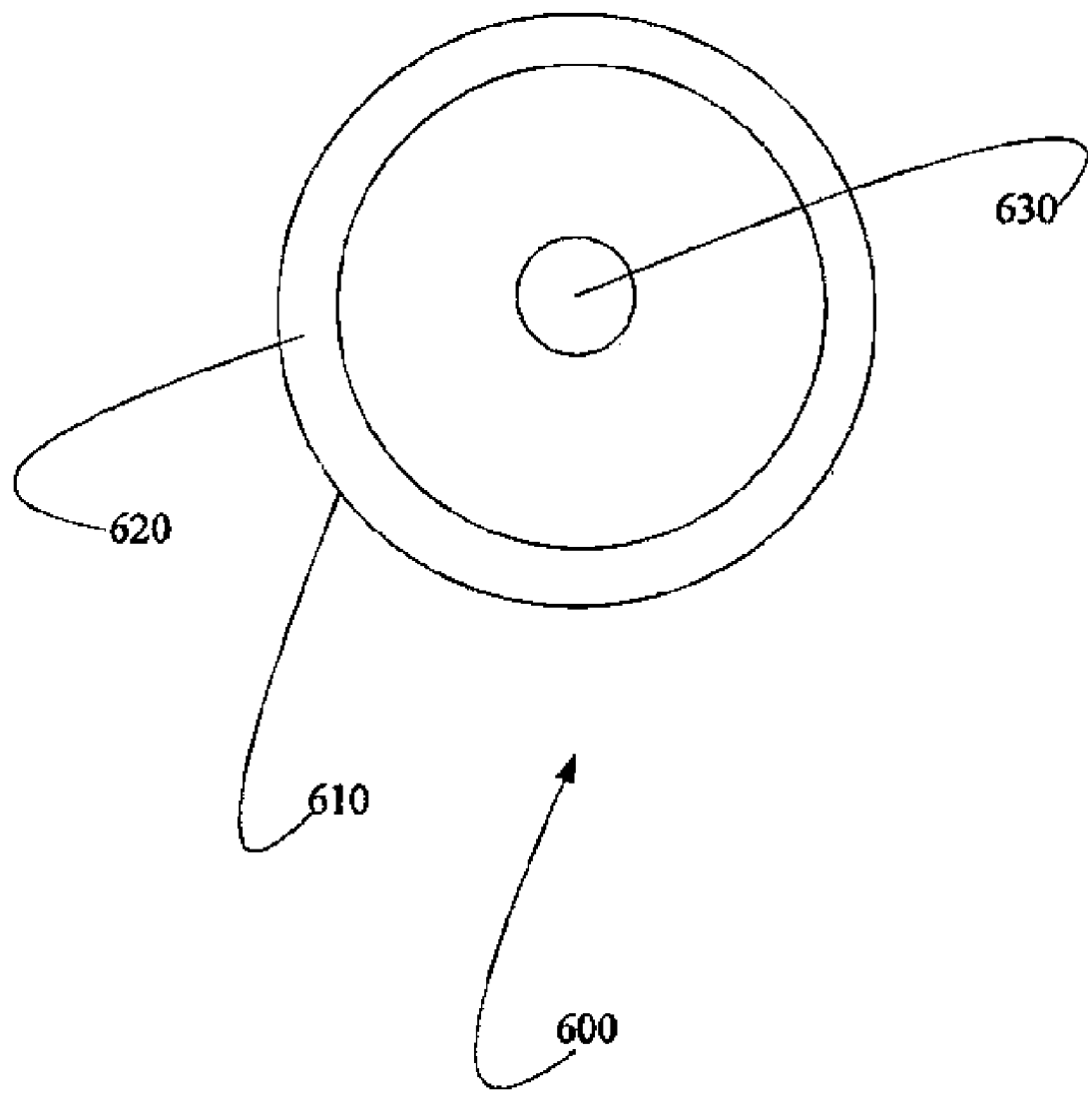
FIG. 6 shows a cross section view of doubling cladding $Tm^{3+}$-doped silicate glass fiber.

FIG. 6 shows a fiber preform 600 comprising first cladding 610, second cladding 620, and core 630. In certain embodiments, the first cladding diameter was about 245 microns, the second cladding diameter was about 210 microns, and the core diameter was about 21.5 microns.

Figure 7:
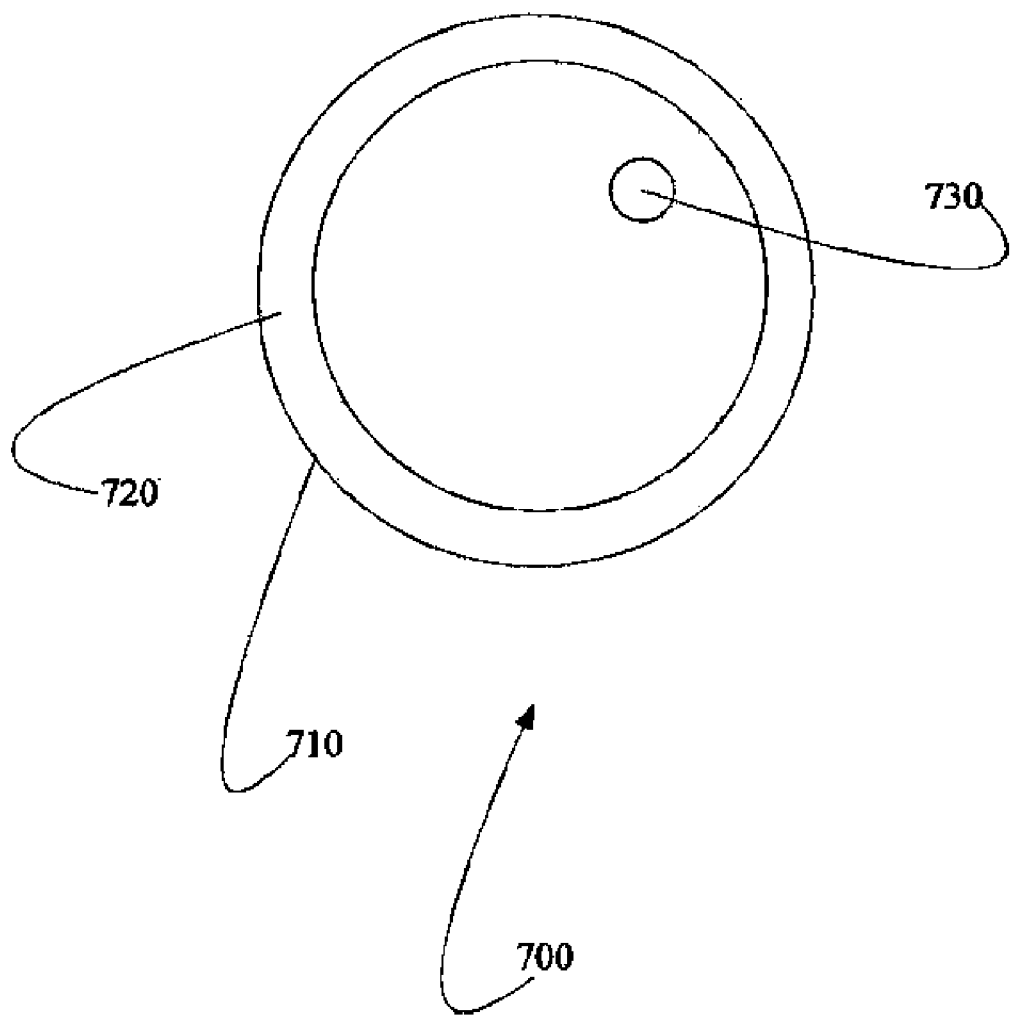
FIG. 7 shows a cross section view of on off-center double cladding $Tm^{3+}$-doped silicate glass fiber.

FIG. 7 shows a fiber preform 700 comprising first cladding 710, second cladding 720, and off-center core 730. In certain embodiments, the first cladding diameter was about 231 microns, the second cladding diameter was about 195.5 microns, and the core diameter was about 20.5 microns.

Figure 8:
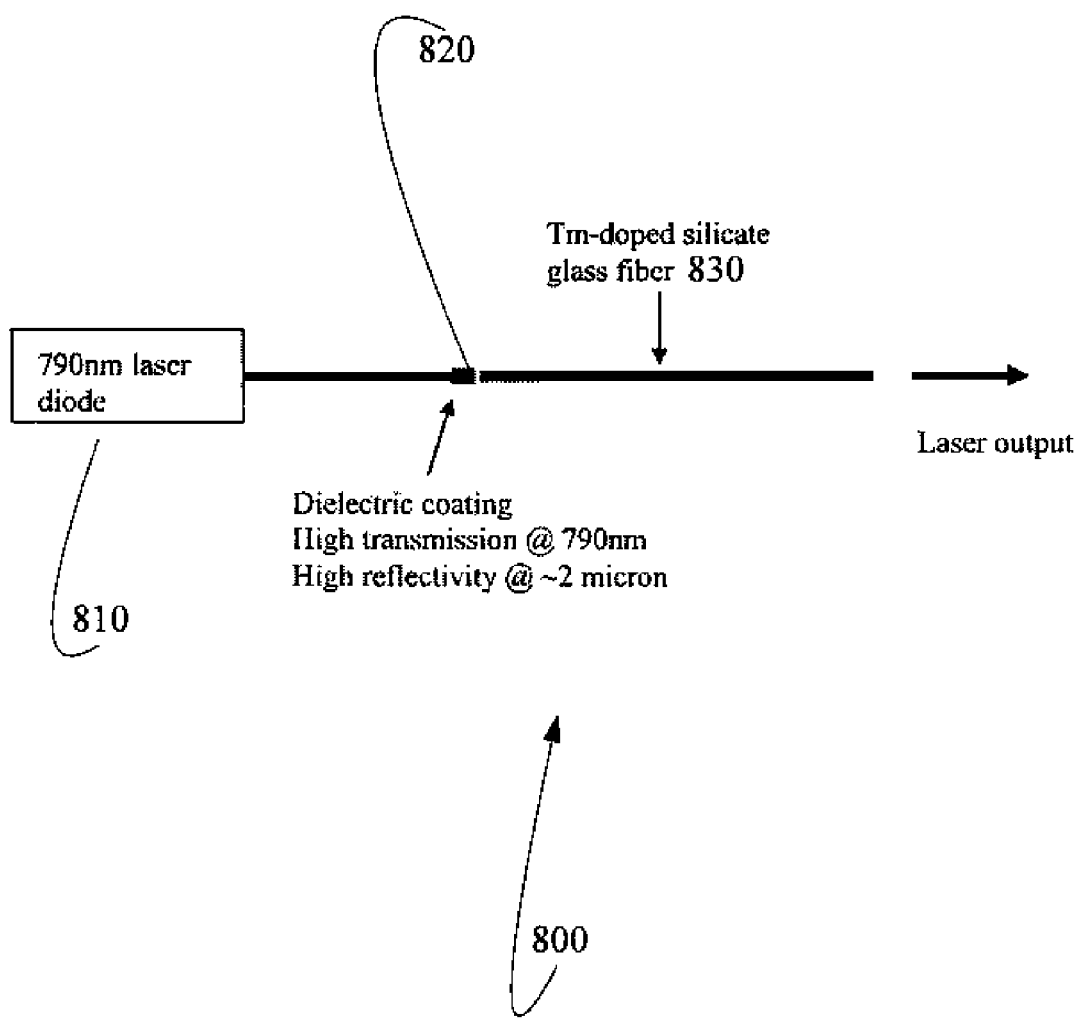
FIG. 8 is a block diagram showing Applicants' apparatus used for fiber laser characterization.

FIG. 8 illustrates apparatus 800 which was used for fiber laser characterization. Fiber pigtailed multi-mode 790 nm diode laser 810 was used as pump source. The core of the pump laser delivery fiber is 200 micron. The delivery fiber of the pump laser is fusion spliced with a silica fiber 820 with dielectric coating. Dielectric mirror was coated at the end of silica fiber with core and cladding diameters of 200 microns and 240 microns, respectively. The dielectric coating exhibits high reflectivity at 1.9 micron and high transmission at 790 nm. No coating is used for output coupler. Fresnel reflection of approximately 5% from the $Tm^{3+}$-doped silicate glass fiber was used to form the fiber laser cavity.

Figure 3:
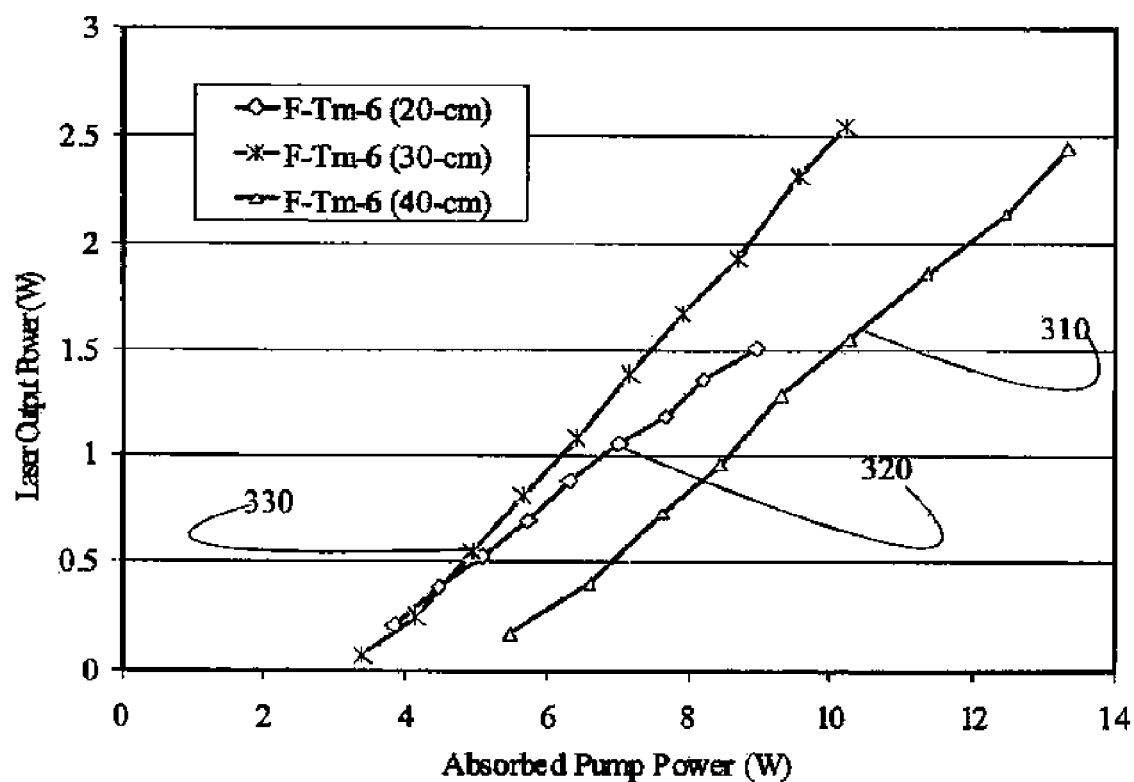
FIG. 3 illustrates fiber laser performance.

FIG. 3 shows the fiber laser test results using apparatus 800 (FIG. 8) and F—Tm-6 fiber with different fiber lengths. The cross section view of F—Tm-6 fiber was shown in FIG. 7. Curve 310 was obtained using a 20 cm fiber length. Curve 320 was obtained using a 30 cm fiber length. Curve 340 was obtained using a 30 cm fiber length.

A slope efficiency of 38% was achieved in F—Tm-6 fiber with 30-cm fiber length. It should be noted that the slope efficiency depends heavily on the reflectivity of the output coupler. Here the reflectivity of the output coupler is fixed because we simply use the Ffresnel reflection of the output end of the fiber. The slope efficiency can be significantly improved by optimizing output coupler.

While the preferred embodiments of the present invention have been illustrated in detail, it should be apparent that modifications and adaptations to those embodiments may occur to one skilled in the art without departing from the scope of the present invention as set forth in the following claims.

We claim:

1. A laser fiber to emit laser light from 1.7 micron to 2.2 micron, comprising:
    a silicate laser glass comprising:
        a network former of $SiO_2$ from about 30 weight percent to about 90 weight percent;
        a glass network modifier (MO) selected from BaO, CaO, MgO, ZnO, PbO, $K_2O$, $Na_2O$, $Li_2O$, $Y_2O_3$, or combinations thereof, from 5 weight percent to 40 weight percent; and
        a glass network intermediator (XO) selected from $Al_2O_3$, $B_2O_3$, $La_2O_3$, or combinations thereof, from 0.5 weight percent to 40 weight percent;
    Holmium ions; and
    Thulium ions.

2. The laser fiber of claim 1, wherein:
    said Thulium ions are introduced into said glass host as Thulium oxide; and
    said Holmium ions are introduced into said glass host as Holmium oxide.

3. The laser fiber of claim 2, comprising:
    Thulium oxide from about 2 weight percent to about 15 weight percent; and
    Holmium oxide from about 0.1 weight percent to about 3 weight percent.

4. The laser fiber of claim 3, comprising:
    Thulium oxide from about 3 weight percent to about 10 weight percent;
    Holmium oxide from about 0.2 weight percent to about 2 weight percent.

5. The laser fiber of claim 4, comprising:
    $SiO_2$ from about 40 weight percent to about 80 weight percent;
    said glass network modifier from about 10 weight percent to about 40 weight percent;
    said glass network intermediator from about 1 weight percent to about 30 weight percent.

6. The laser fiber of claim 3, comprising:
    Thulium oxide from about 4 weight percent to about 7 weight percent;
    Holmium oxide from about 0.3 weight percent to about 12 weight percent.

7. The laser fiber of claim 6, comprising:
    $SiO_2$ from about 50 weight percent to about 70 weight percent;
    said glass network modifier from about 15 weight percent to about 35 weight percent;
    said glass network intermediator from about 1.5 weight percent to about 20 weight percent.

* * * * *

UNITED STATES PATENT AND TRADEMARK OFFICE
CERTIFICATE OF CORRECTION

PATENT NO. : 8,121,154 B2  
APPLICATION NO. : 12/113865  
DATED : February 21, 2012  
INVENTOR(S) : Jiang Shibin and Luo Tao Page 1 of 1

It is certified that error appears in the above-identified patent and that said Letters Patent is hereby corrected as shown below:

On the Title Page, Item (54) line 2, and in the Specification, Column 1, line 2, "SILICATED" should be --SILICATE--

Signed and Sealed this  
Twenty-third Day of September, 2014

Michelle K. Lee  
*Deputy Director of the United States Patent and Trademark Office*